United States Patent
Dearden et al.

[11] Patent Number: 5,978,861
[45] Date of Patent: Nov. 2, 1999

[54] DEVICE AND METHOD FOR CONTINUOUSLY POLLING FOR COMMUNICATION BUS TYPE AND TERMINATION

[75] Inventors: Grant W. Dearden, Henefer; Jon B. Newman, Centerville; William P. Baker, Salt Lake City, all of Utah

[73] Assignee: Iomega Corporation, Roy, Utah

[21] Appl. No.: 08/940,790

[22] Filed: Sep. 30, 1997

[51] Int. Cl.⁶ .................................................. H01J 13/00
[52] U.S. Cl. .................................. 710/8; 710/16; 710/38; 710/126; 710/129; 340/825.52
[58] Field of Search .......................... 340/825.52, 825.2; 710/16, 8, 38, 129, 126, 100, 101, 102, 104, 106, 128

[56] References Cited

U.S. PATENT DOCUMENTS

| | | | |
|---|---|---|---|
| 4,603,320 | 7/1986 | Farago | 340/347 DD |
| 4,674,085 | 6/1987 | Aranguren et al. | 370/85 |
| 4,713,827 | 12/1987 | Lauffer et al. | 375/7 |
| 4,723,120 | 2/1988 | Petty, Jr. | 340/825.02 |
| 4,864,291 | 9/1989 | Korpi | 340/825.5 |
| 4,914,625 | 4/1990 | Billian | 364/900 |
| 4,920,339 | 4/1990 | Friend et al. | 340/825.52 |
| 4,972,470 | 11/1990 | Farago | 380/3 |
| 4,973,955 | 11/1990 | Avaneas | 340/825.05 |
| 5,029,284 | 7/1991 | Feldbaumer et al. | 307/443 |
| 5,031,115 | 7/1991 | Hayashi | 364/519 |
| 5,099,137 | 3/1992 | Lattin, Jr. | 307/147 |
| 5,101,481 | 3/1992 | Anger et al. | 395/325 |
| 5,119,498 | 6/1992 | McNeill et al. | 395/800 |
| 5,150,465 | 9/1992 | Bush et al. | 395/275 |
| 5,165,022 | 11/1992 | Erhard et al. | 395/883 |
| 5,245,703 | 9/1993 | Hubert | 395/200 |
| 5,287,460 | 2/1994 | Olsen et al. | 395/883 |
| 5,289,580 | 2/1994 | Latif et al. | 395/275 |
| 5,313,595 | 5/1994 | Lewis et al. | 395/325 |
| 5,321,819 | 6/1994 | Szczepanek | 395/325 |
| 5,434,516 | 7/1995 | Kosco | 326/30 |
| 5,544,326 | 8/1996 | Pease et al. | 395/872 |
| 5,548,782 | 8/1996 | Micheals et al. | 395/835 |
| 5,555,374 | 9/1996 | Armerding et al. | 395/835 |
| 5,577,213 | 11/1996 | Avery et al. | 395/280 |
| 5,666,557 | 9/1997 | Cassidy et al. | 395/828 |
| 5,703,347 | 12/1997 | Reddersen et al. | 235/472 |
| 5,832,244 | 11/1998 | Jolley et al. | 395/309 |

OTHER PUBLICATIONS

American National Standards Institute, "Small Computer System Interface–2", New York, 1994, 20–24.

Black Box Catalog, "Serial Data Transmission", Pittsburgh, PA, Sep. 1992, 166.

*Primary Examiner*—Larry D. Donaghue
*Attorney, Agent, or Firm*—Woodcock Washburn Kurtz Mackiewicz & Norris LLP

[57] ABSTRACT

Method and apparatus are disclosed for repeatedly monitoring the communication bus type and concurrently monitoring to determine if termination of the communication bus is necessary. The method comprises the steps of initializing several communication lines to logical high; determining based on the value of the input lines whether the communication bus is a parallel bus or SCSI bus; if the bus is SCSI bus, sending a low signal followed by a high signal across the output of one of the communication lines; sensing whether the communication line follows the biasing; if the output communication line follows the biasing, terminating the communication bus; if the output communication line does not follow the biasing, not terminating the communication bus. The apparatus comprises eight communication lines of the communication bus and a microprocessor electrically connected to the communication bus for stimulating and monitoring the eight communication lines in accordance with the above method.

5 Claims, 3 Drawing Sheets

DEVICE AND METHOD FOR CONTINUOUSLY POLLING FOR COMMUNICATION BUS TYPE AND TERMINATION

RELATED APPLICATIONS

This application is related to commonly assigned U.S. patent application Ser. No. 08/239,999, filed May 9, 1994, entitled "Automatic Termination For Computer Networks" which is currently involved in an interference and which is hereby incorporated by reference. Also, this application is related to commonly assigned U.S. patent application Ser. No. 08/604,499, filed Feb. 20, 1996, entitled "Multiple Input/Output Port For A Peripheral Device" which is hereby incorporated by reference.

FIELD OF THE INVENTION

This invention relates generally to computer systems. More particularly, the present invention relates to methods and apparatus for repeatedly determining the type of communication bus to which a device is connected and continuously polling the output communication bus to determine if the bus should be terminated.

BACKGROUND OF THE INVENTION

A variety of interface ports or buses exist for enabling communication between a host computer and one or more peripheral devices such as disk drives, printers, and the like. Types of interface buses include the Small Computer Systems Interface (SCSI) bus and a number of parallel buses, including the standard unidirectional parallel port found in early IBM PCS, the bi-directional parallel port, the extended capability port (ECP), the enhanced parallel port (EPP), and the IEEE-1284 standard parallel port. Communication over each of these different interface buses is usually performed in accordance with a communication protocol specific to the particular bus structure.

Unfortunately, the existence of such a variety of interface buses and associated communication protocols creates compatibility problems. For example, a disk drive may be configured to communicate across a SCSI-2 interface while the host computer has a single parallel port interface. Prior to recent advances in the art, such devices that used incompatible bus protocols could not operate together.

In commonly assigned U.S. patent application Ser. No. 08/604,499, filed Feb. 20, 1996, entitled "Multiple Input/Output Port For a Peripheral Device" which is hereby incorporated by reference, there is disclosed a device which provides for connection to multiple bus types. The device comprises an interface bus detection circuit that automatically detects the type of interface bus and a plurality of interface adapters which are employed depending upon the bus type.

Another recent advancement in the art has been in the area of SCSI termination. A SCSI bus must be terminated at both ends for proper operation. If a SCSI bus is not terminated correctly, the devices connected to the bus may not operate correctly or may not function at all. Similarly, terminating at places other than the ends of the bus can result in excessive loading of the cable circuits which could also cause errors.

Prior to recent advances in the art, SCSI termination was done manually. Manual termination proved time consuming and beyond the ability of many users. In commonly assigned U.S. patent application Ser. No. 08/239,999, filed May 9, 1994, entitled "Automatic Termination For Computer Networks" which is hereby incorporated by reference, there is disclosed an apparatus for automatic SCSI termination. In that application, a sense circuit is disclosed that detects whether another device is connected to the device. A switchable terminator responds to the sense circuit to automatically connect the proper terminating impedance.

Thus, a device has been developed for automatically determining the type of port to which a device is connected. Likewise, a device has been developed for automatically terminating a SCSI device. However there are further needs in the art.

It is sometimes necessary to add and remove devices to a computer system while the system is in operation. Often devices are added and removed from a daisy-chain configuration. Furthermore, the host computer port to which a peripheral is attached is sometimes changed during operation of the system. This often results in a change in port type from parallel to SCSI or vice verse. Changing the port type presents the problem whereby when the port type is changed from parallel bus to SCSI bus, it becomes necessary to terminate the last device in the chain. Similarly, changing from SCSI to parallel requires removing termination. Presently, there is no device that recognizes that a change in port type has taken place and activates or deactivates termination as appropriate.

Therefore, there is a need in the art for a device which simultaneously monitors the type of port to which the device is connected, and upon detection that the device is connected to a SCSI port, automatically terminates the device when appropriate.

SUMMARY OF THE INVENTION

Accordingly, it is the general object of the present invention to provide a device and method of repeatedly monitoring a device during operation to determine the type of port to which the device is connected and automatically terminating the device when appropriate.

Briefly, this object, as well as other objects of the current invention, is accomplished in a peripheral device having a communication bus into and out of the peripheral device. The communication bus comprises communication lines 25, 19, 16, 14, 7, 9, 22, and 23. Communication line 16 is electrically broken within the peripheral device. The peripheral device provides a method for identifying the type of communication bus with which the peripheral device should be configured to communicate and automatically terminating the communication port if electrical termination is necessary. The method comprises the steps of: initializing a subset of the communication lines to have a positive voltage; sensing the signals received over a subset of the communication lines into the device to determine whether the communication bus is a parallel bus; sensing the signals received over a subset of the communication lines into the device to determine whether the communication bus is a SCSI bus; if the communication bus is a SCSI bus, transmitting a signal along communication line 16 out of the device which causes the line to become logically low; sensing communication line 16 out of the device to determine if the communication line remains low; if communication line 16 does not remain logically low, deactivating the termination means and considering the necessity to reevaluate the identification of the bus as a SCSI bus; if communication line 16 remains low, transmitting a signal along communication line 16 out of the device which causes the line to become logically high; sensing communication line 16 out of the device to determine if the communication line remains logically high; if the communication line 16 does not remain logically high, deactivating the termination means and considering the necessity to reevaluate the identification of the bus as a SCSI bus; and if the communication line remains logically high, activating the termination means and considering the necessity to reevaluate the identification of the bus as a SCSI bus.

According to another aspect of the present invention, there is provided in a peripheral device, an apparatus, comprising at least eight communication lines into and out of the peripheral device, wherein one of the eight is electrically broken in the device and a microprocessor electrically connected to the eight communication lines. The microprocessor has instructions located therein for performing the following steps: initializing a subset of the eight communication lines to have a positive voltage; sensing the signals received over a subset of the eight communication lines into the device to determine whether the communication bus is a parallel bus; sensing the signals received over a subset of the eight communication lines into the device to determine whether the communication bus is a SCSI bus; if the communication bus is a SCSI bus, transmitting a signal along the one electrically broken line out of the device which causes the line to become logically low; sensing the one electrically broken line out of the device to determine if the communication line remains low; if the one electrically broken line out of said device does not remain logically low, deactivating the termination means and considering the necessity to reevaluate the identification of the bus as a SCSI bus; if the one electrically broken line out of the device remains low, transmitting a signal along the one electrically broken line out of the device which causes the line to become logically high; sensing the one electrically broken line out of the device to determine if the communication line remains logically high; if the one electrically broken line does not remain logically high, deactivating the termination means and considering the necessity to reevaluate the identification of the bus as a SCSI bus; if the one electrically broken line remains logically high, activating the termination means and considering the necessity to reevaluate the identification of the bus.

Additional features and advantages of the present invention will become evident hereinafter.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings embodiments that are presently preferred, it being understood, however, that the invention is not limited to the specific methods and instrumentalities disclosed. In the drawings.

DETAILED DESCRIPTION OF THE INVENTION

A preferred embodiment of the invention will now be described with reference to the FIGURES. The description provided herein is for exemplary purposes only and is not intended in any way to limit the scope of the invention.

The present invention provides an apparatus and method for identifying the type of communication port with which a peripheral device should be configured to communicate and if necessary, depending upon the type of port, continuously polling the pass through communication port to determine if electrical termination is necessary. In the preferred embodiment the invention is implemented as part of a media drive. In particular, the inventive device and method are implemented as part of the ZipPlus drive manufactured by Iomega Corporation.

The signals into the device are repeatedly monitored to determine the type of communication port with which the device should be configured to communicate. Concurrently the pass through communication port is monitored to determine if termination is required. Generally, the present invention determines whether termination is necessary by stimulating particular communication line(s) in the pass through communication bus and sampling the responses of these same communication lines. Based upon the signals received in response to the stimuli, the inventive apparatus can determine whether termination is required and send the appropriate signals to activate or deactivate termination.

The concurrent and repeated monitoring of the input and pass through sides of the communication bus is accomplished by placing an electrical disconnect in one or more of the communication lines of the communication bus. This is in contrast to the prior art sensing devices which did not break the communication line and were therefore limited to configuration of the port type only once, generally upon startup.

Figure 1:
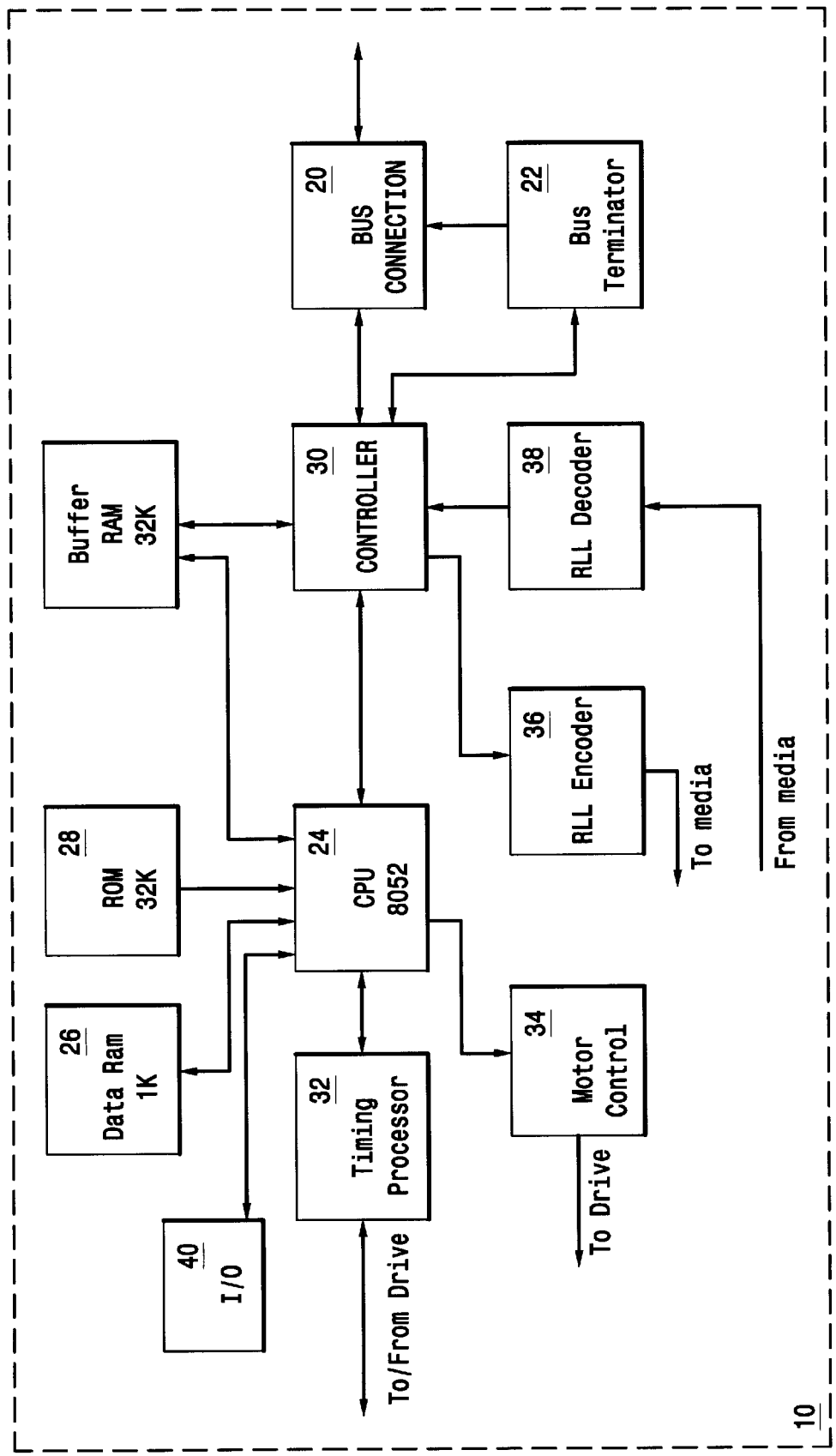
FIG. 1 is a functional block diagram of the inventive device.

FIG. 1 presents a functional block diagram of the inventive device 10 implemented with a communications port 20 into and out of the device 10 which may be switched randomly during operation to either small computer systems interface (SCSI) or parallel interface. The device 10 electronics comprise eleven main subcomponents: a bus connection 20; a bus terminator 22; a CPU 24, for example, an 8052; a 1k Data RAM memory 26 for executing local programs; a 32k ROM memory 28 for storage of programs; a controller circuit 30, such as an AIC-7166 manufactured by Adaptec, which controls buffer management of data to and from the media, media interface, and processor interface via the communication bus; Timing Processor 32 for providing timing signals to the servo motors and the read/write channel; motor control circuitry 34; an RLL encoder 36 for writing data to the media; an RLL decoder 38 for reading data from the media; and I/O controller 40.

Figure 2:
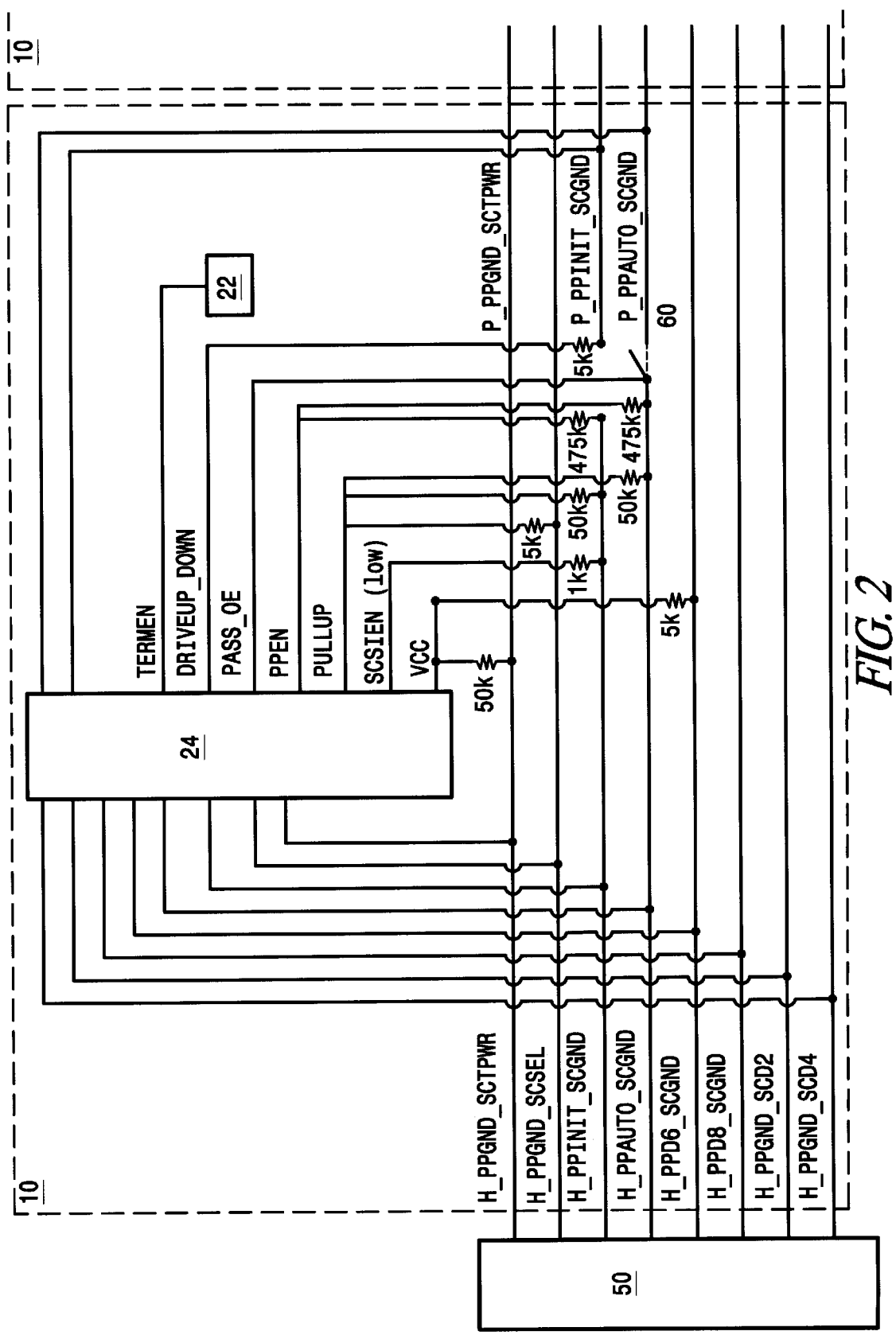
FIG. 2 is detailed diagram of the communication lines in the inventive device.

FIG. 2 provides a detailed view of the communication lines into and out of the inventive device 10. As shown, a host computer 50 is connected via a communication bus to the inventive device 10. A portion of a second inventive device 10 is shown connected to the first inventive device 10. The second device 10 represents that the present inventive device 10 is designed to be daisy chained together with other devices.

Eight communication lines are shown passing between the host computer and the inventive device as well as between the first and second device. Typically, there are many communication lines in a communication bus. However, because only eight of the communication lines are used in the present inventive device to determine the type of port as well as determine whether termination is necessary, only eight lines are shown. The signals received over the eight communication lines are designated: H_PPGND_SCTPWR which represents the signal received over line 25 of the communication bus; H_PPGND_SCSEL which represents the signal received over communication line 19; H_PPINIT_SCGND which represents the signal received over line 16 of the communication bus; H_PPAUTO_SCGND which represents the signal received over line 14 of the communication bus; H_PPD6_SCGND which represents the signal received over line 7 of the communication bus; H_PPD8_SCGND which represents the signal received over line 9 of the communication bus; H_PPGND_SCD2 which represents the signal received over line 22 of the communication bus; and H_PPGND_SCD4 which represents the signal received over line 23 of the communication bus. In the present preferred embodiment, the H_PPINIT_SCGND signal line is electrically broken so as to allow for simultaneous monitoring of both the input side of the communication bus to determine port type, and the pass through side of the communication bus to determine if termination is necessary. Of course, other lines could be broken so as to perform monitoring at both ends.

The inventive device operates by monitoring the signals received over the various communication lines and when appropriate stimulating various lines and monitoring the reaction of the lines. As shown, each of the eight communication lines is connected to an input of the CPU 24 which allows for monitoring of the signals received over the lines. Furthermore, several output pins of the CPU 24 are connected to various of the communication lines.

Signals are transmitted by the CPU 24 to the communication lines so as to control and monitor the communication lines as described below in connection with FIG. 3. A constant current voltage VCC is connected to H_PPGND_SCTPWR through a 50K ohm pull up resistor and to H_PPD6_SCGND through a 5K ohm pull up resistor. Signal SCSIEN (SCSI enable) which is set low to designate that the device should be set to operate with a SCSI interface is connected to H_PPINIT_SCGND through a 1K ohm pull down resistor. Signal PULLUP which is used to establish an initial logical high value across communication lines, is attached to: H_PPGND_SCSEL through a 5K ohm pull up resistor; H_PPINIT_SCGND through a 50K ohm pull up resistor; and H_PPAUTO_SCGND through a 50K ohm pull up resistor. Signal PPEN (parallel port enable) which is set high to designate that the device is connected to a parallel port is connected to H_PPINIT_SCGND through a 475K ohm resistor and to H_PPAUTO_SCGND through a 475K ohm resistor. Signal PASS_OE is connected to activate and deactivate pass through on communication line H_PPAUTO_SCGND. Signal DRIVEUP_DOWN which is used to bias the signal P_PPINIT_SCGND received on the pass through side of the communication port is connected through a 5K ohm resistor to line 16 on the pass through side of the port. Signal TERMEN (terminate enable) which activates termination is connected to a SCSI termination device 22. The termination device 22 may be one of several commercial termination products such as model number TIL-2218 manufactured by Texas Instruments Corporation.

As shown, the majority of the communication bus lines pass uninterrupted through the device to the second device. However, in the preferred embodiment, the communication line carrying signal H_PPINIT_SCGND is broken. The break in the communication line allows the device 10 to repeatedly monitor the input signal value received over pin 16 while simultaneously monitoring the value received over pin 16 of the pass through connection. In prior art devices, the signal received over the input of the communication line could be polled only once upon startup. Thus, in prior art devices it was not possible to allow changes in the type of port to which the device was connected. Changing ports during operation would cause communication to fail. However, in the present inventive device, the break in the communication line allows for monitoring both ends of the communication line. Thus, the present invention allows for switching of ports during operation of the device. When the port type is switched, the present invention can respond by activating or deactivating SCSI termination as necessary. For example, if the port type is switched from parallel to SCSI, the device recognizes the change and automatically determines whether the device is the last device in the SCSI daisy chain. If so, the device terminates the pass through communication port. Thus, the break in the communication line, by providing for repeated polling of the signals received from both ends of the communication bus, allows for port type detection as well as automatic SCSI termination. It should be noted that although the communication line corresponding to pin 16 is broken in the presently preferred embodiment, other lines could alternatively be broken.

Figure 3:
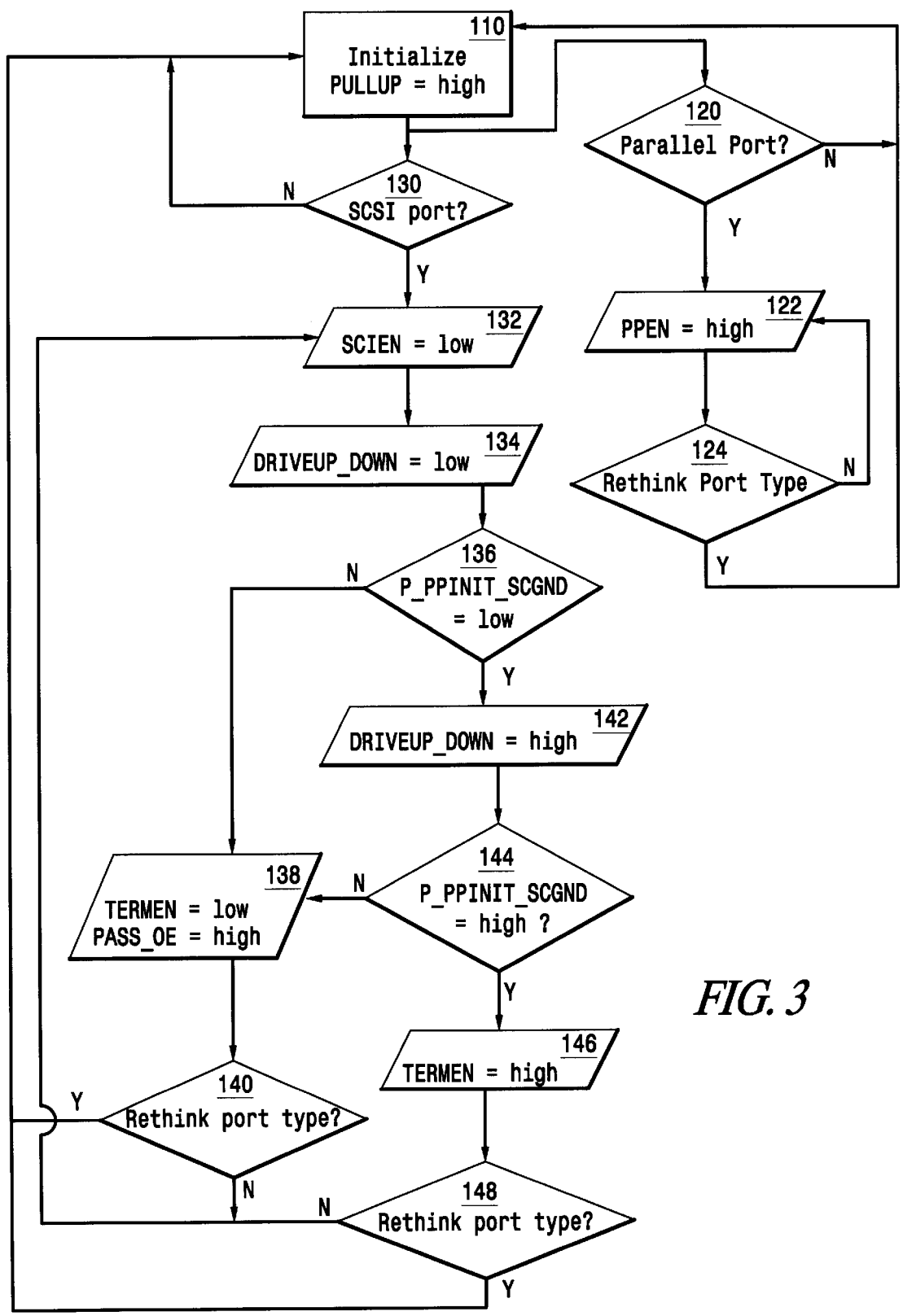
FIG. 3 is a flow diagram of the inventive method.

FIG. 3 is a flow diagram of the inventive method of monitoring for port type and termination requirements. In step 110 output signals VCC and PULLUP are given a positive voltage or sent logically high. This has the effect of electrically pulling up several of the communication lines to initialize them to a logical high or positive voltage value. In particular, signals H_PPGND_SCTPWR, H_PPGND_SCSEL, H_PPINIT_SCGND, H_PPAUTO_SCGND, and H_PPD6_SCGND are set to a positive high voltage. Initializing these signals high is necessary to account for variances between computer manufacturers. Some manufacturers initialize communication lines to have a positive voltage while others do not. Furthermore, depending upon the manufacturer, some lines may not be driven at all while other lines may not be electrically connected so as to carry current. Thus, in order to provide a consistent algorithm that will account for such inconsistencies and allow the inventive apparatus and method to be operable with all devices, the present method initializes these values to logical high.

Because the present invention may be connected to either parallel or SCSI ports, it is necessary to determine the type of port to which the device is attached. Furthermore, because the type of port can sometimes change, even during operation of the device, it is necessary to repeatedly check the port type during the operation of the device. The type of port is identified by the signals received over particular lines of the communications bus.

At step 120, the central processing unit 24 determines whether the device is connected to a parallel port by monitoring signals H_PPGND_SCTPWR, H_PPINIT_SCGND, H_PPGND_SCSEL, and H_PPAUTO_SCGND. In particular, the communication port is identified as a parallel port if either of the following are true: H_PPGND_SCTPWR is low; H_PPINIT_SCGND is high and H_PPGND_SCSEL is low; or H_PPAUTO_SCGND is high and H_PPGND_SCSEL is low. If the connection is identified as a parallel port, at step 122 PPEN is set high and transmitted from the central processor 24 to pull signals H_PPINIT_SCGND and H_PPAUTO_SCGND high.

Thereafter, at step 124, it is determined whether it is necessary to re-address the communication port designation. If PPEN and either H_PPGND_SCD2 or H_PPGND_SCD4 remain high, then it is necessary to re-address the parallel port designation and control returns to initialization step 110. However, if both H_PPGND_SCD2 and H_PPGND_SCD4 continue low, this indicates that the designation as a parallel port is still valid and process returns to step 122.

At step 130, the method identifies the connection as a SCSI connection if signal H_PPGND_SCTPWR is high, signal H_PPINIT_SCGND is low, and signal H_PPAUTO_SCGND is low. If the port is not a SCSI communication bus, control passes to step 110 where the input communication signal values are initialized high.

If at step 130, it is determined that the connection is a SCSI connection, the method undergoes a series of steps to determine whether termination of the device is required. At step 132, SCSIEN is given a negative voltage or logical low value, indicating that the device is a SCSI device. As explained in greater detail below, setting SCSIEN low has the effect of indicating to inventive devices which are connected in front of the device that there are other devices in the chain and termination is not necessary. At step 134 an electric signal DRIVEUP_DOWN, preferably 24 mA, is transmitted by the CPU to a 4K ohm pull down resistor. The resulting logical low signal, P_PPINIT_SCGND is transmitted across the communication pass through port.

If, at step 136, P_PPINIT_SCGND does not remain at a logical low state, this indicates that another device is connected to the pass through communication bus and termination is not required. At step 138, TERMEN (termination enable) is set to low and PASS_OE (pass through enable) is set to logical high. Setting PASS_OE to logical high closes an electrical switch 60 (FIG. 2) and allows signal H_PPAUTO_SCGND to pass through to the device that is connected to the pass through communication bus. Sending TERMEN low deactivates the SCSI termination.

At step 140, it is determined whether to readdress the communication port designation. If SCSIEN and either H_PPD6_SCGND or H_PPD8_SCGND continue high, then it is necessary to re-address the communication port designation as a SCSI port. However, if both H_PPGND_SCD2 and H_PPGND_SCD4 go low, this indicates that the designation as a SCSI port is still valid and it is not necessary to readdress the communication port designation. If it is determined that the port type should be readdressed, control returns to initialization step 110. If it is not necessary to readdress the port type designation, the process returns to step 132.

If, at step 136, the signal P_PPINIT_SCGND remains at a logical low state, this indicates that possibly no other SCSI equipment is connected to the communication line. At step 142 electric signal DRIVEUP_DOWN, preferably 12 mA, is transmitted to pull up a 5K ohm resistor. The resulting logical high signal, P_PPINIT_SCGND is transmitted across the communication out port.

If, at step 144 P_PPINIT_SCGND does not remain high in response to the biasing, this indicates that another device has been identified on the pass through connection and therefore termination is not required. In such case, control passes to step 138.

It should be noted that P_PPINIT_SCGND will remain low if H_PPINIT_SCGND is held low in the succeeding device. As explained above, H_PPINIT_SCGND is held low when SCSIEN goes low after identifying the device as a SCSI device. Thus, if the succeeding device has identified itself as a SCSI device and sent SCSIEN low, at step 144 a device will recognize the succeeding device and acknowledge that termination is not required.

If at step 144 P_PPINIT_SCGND remains high in response to the biasing, this indicates that no device is connected to the pass through connection and automatic termination is required. Under those circumstances, at step 146, the device is terminated by transmitting a logical high signal TERMEN (termination enable) to the terminating device.

Thereafter, at step 148, it is determined whether to readdress the communication port designation. If SCSIEN and either H_PPD6_SCGND or H_PPD8_SCGND remain high, then it is necessary to re-address the communication port designation and control returns to initialization step 110. However, if both H_PPGND_SCD2 and H_PPGND_SCD4 go low, this indicates that the designation as a SCSI port is still valid and process returns to step 132.

As the foregoing illustrates, the present invention is directed to methods and apparatus for monitoring the type of port to which a device is connected and terminating the communication bus if necessary. The present invention may be embodied in other specific forms without departing from the spirit or essential attributes thereof. For example, different communication lines other than that connected to line 16 could be electrically interrupted and monitored to make the bus type and termination calculations. Accordingly, reference should be made to the appended claims, rather than to the foregoing specification, as indicating the scope of the invention.

What is claimed is:

1. In a peripheral device having a communication bus into and out of the peripheral device wherein the communication bus has communication lines 25, 19, 16, 14, 7, 9, 22, and 23 therein and communication line 16 is electrically broken within the peripheral device, and having a termination means for terminating the communication bus, a method for identifying the type of communication bus with which the peripheral device should be configured to communicate and automatically terminating the communication bus if electrical termination is necessary, comprising the steps of:

initializing a subset of the communication lines to have a positive voltage;

sensing the signals received over a subset of the communication lines into the device to determine whether the communication bus is a parallel bus;

sensing the signals received over a subset of the communication lines into the device to determine whether the communication bus is a SCSI bus;

if the communication bus is a SCSI bus, transmitting a signal along communication line 16 out of the device which causes the line to become logically low;

sensing communication line 16 out of the device to determine if the communication line remains low; if communication line 16 does not remain logically low, deactivating the termination means and considering the necessity to reevaluate the identification of the bus as a SCSI bus;

if communication line 16 remains low, transmitting a signal along communication line 16 out of the device which causes the line to become logically high;

sensing communication line 16 out of the device to determine if the communication line remains logically high;

if the communication line 16 does not remain logically high, deactivating the termination means and considering the necessity to reevaluate the identification of the bus as a SCSI bus; and if the communication line remains logically high, activating the termination means and considering the necessity to reevaluate the identification of the bus as a SCSI bus.

2. In a peripheral device having a communication bus into and out of the peripheral device wherein the communication bus has a plurality of communication lines therein and having a termination means for terminating the communication bus, an apparatus for identifying the type of communication bus with which a peripheral device should be configured to communicate and for continuously polling the communication bus to determine if electrical termination is necessary, comprising:

at least eight communication lines into and out of the peripheral device of said plurality of communication lines wherein at least one of said eight communication lines is electrically broken; and a microprocessor electrically connected to said at least eight communication lines, said microprocessor having instructions located therein for performing the following steps:

initializing a subset of said eight communication lines to have a positive voltage;

sensing the signals received over a subset of said eight communication lines into the device to determine whether the communication bus is a parallel bus;

sensing the signals received over a subset of said eight communication lines into the device to determine whether the communication bus is a SCSI bus;

if the communication bus is a SCSI bus, transmitting a signal along said one electrically broken line out of the device which causes the line to become logically low;

sensing said one electrically broken line out of the device to determine if the communication line remains low;

if said one electrically broken line out of said device does not remain logically low, deactivating the termination means and considering the necessity to reevaluate the identification of the bus as a SCSI bus;

if said one electrically broken line out of said device remains low, transmitting a signal along said one electrically broken line out of the device which causes the line to become logically high;

sensing said one electrically broken line out of the device to determine if the communication line remains logically high;

if said one electrically broken line does not remain logically high, deactivating the termination means and consider the necessity to reevaluate the identification of the bus as a SCSI bus;

if said one electrically broken line remains logically high, activating the termination means and consider the necessity to reevaluate the identification of the bus as a SCSI bus.

3. In a peripheral device having a communication bus into and out of the peripheral device wherein the communication bus has a plurality of communication lines therein and having a termination means for terminating the communication bus, an apparatus for identifying the type of communication bus with which a peripheral device should be configured to communicate and for continuously polling the communication bus to determine if electrical termination is necessary, comprising:

at least communication lines numbered 25, 19, 16, 14, 7, 9, 22, and 23 into and out of the peripheral device of said plurality of communication lines wherein at least line 16 of said eight communication lines is electrically broken; and a microprocessor electrically connected to said at least eight communication lines, said microprocessor having instructions located therein for performing the following steps:

initializing a subset of the communication lines to have a positive voltage;

sensing the signals received over a subset of the communication lines into the device to determine whether the communication bus is a parallel bus;

sensing the signals received over a subset of the communication lines into the device to determine whether the communication bus is a SCSI bus;

if the communication bus is a SCSI bus, transmitting a signal along communication line 16 out of the device which causes the line to become logically low;

sensing communication line 16 out of the device to determine if the communication line remains low;

if communication line 16 does not remain logically low, deactivating the termination means and considering the necessity to reevaluate the identification of the bus as a SCSI bus;

if communication line 16 remains low, transmitting a signal along communication line 16 out of the device which causes the line to become logically high;

sensing communication line 16 out of the device to determine if the communication line remains logically high;

if the communication line 16 does not remain logically high, deactivating the termination means and considering the necessity to reevaluate the identification of the bus as a SCSI bus; and if the communication line remains logically high, activating the termination means and considering the necessity to reevaluate the identification of the bus as a SCSI bus.

4. In a peripheral device having a communication bus into and out of the peripheral device wherein the communication bus has a plurality of communication lines therein, at least one of said plurality being electrically broken, and having a termination means for terminating the communication bus, a method for identifying the type of communication bus with which the peripheral device should be configured to communicate and automatically terminating the communication bus if electrical termination is necessary, comprising the steps of:

initializing a subset of said eight communication lines to have a positive voltage;

sensing the signals received over a subset of said eight communication lines into the device to determine whether the communication bus is a parallel bus;

sensing the signals received over a subset of said eight communication lines into the device to determine whether the communication bus is a SCSI bus;

if the communication bus is a SCSI bus, transmitting a signal along said one electrically broken line out of the device which causes the line to become logically low;

sensing said one electrically broken line out of the device to determine if the communication line remains low;

if said one electrically broken line out of said device does not remain logically low, deactivating the termination means and considering the necessity to reevaluate the identification of the bus as a SCSI bus;

if said one electrically broken line out of said device remains low, transmitting a signal along said one electrically broken line out of the device which causes the line to become logically high;

sensing said one electrically broken line out of the device to determine if the communication line remains logically high;

if said one electrically broken line does not remain logically high, deactivating the termination means and consider the necessity to reevaluate the identification of the bus as a SCSI bus;

if said one electrically broken line remains logically high, activating the termination means and consider the necessity to reevaluate the identification of the bus as a SCSI bus.

5. An apparatus for identifying the type of communication bus with which a peripheral device should be configured to communicate and for continuously polling the communication bus to determine if electrical termination is necessary, the apparatus having a communication bus into and out of the aparatus wherein the communication bus has a plurality of communication lines therein and having a termination means for terminating the communication bus, comprising:

at least eight communication lines into and out of the apparatus of said plurality of communication lines wherein at least one of said eight communication lines is electrically broken; and a microprocessor electrically connected to said at least eight communication lines, said microprocessor having instructions located therein for performing the following steps:

initializing a subset of said eight communication lines to have a positive voltage;

sensing the signals received over a subset of said eight communication lines into the apparatus to determine whether the communication bus is a parallel bus;

sensing the signals received over a subset of said eight communication lines into the apparatus to determine whether the communication bus is a SCSI bus;

if the communication bus is a SCSI bus, transmitting a signal along the one electrically broken line out of the apparatus which causes the line to become logically low;

sensing said one electrically broken line out of the apparatus to determine if the communication line remains low;

if said one electrically broken line out of the apparatus does not remain logically low, deactivating the termination means and considering the necessity to reevaluate the identification of the bus as a SCSI bus;

if said one electrically broken line out of the apparatus remains low, transmitting a signal along said one electrically broken line out of the device which causes the line to become logically high;

sensing said one electrically broken line out of the apparatus to determine if the communication line remains logically high;

if said one electrically broken line does not remain logically high, deactivating the termination means and consider the necessity to reevaluate the identification of the bus as a SCSI bus;

if said one electrically broken line remains logically high, activating the termination means and consider the necessity to reevaluate the identification of the bus as a SCSI bus.

* * * * *

UNITED STATES PATENT AND TRADEMARK OFFICE
CERTIFICATE OF CORRECTION

PATENT NO. : 5,978,861  
DATED : November 2, 1999  
INVENTOR(S) : Grant W. Dearden, Jon B. Newman and William P. Baker Page 1 of 1

It is certified that error appears in the above-identified patent and that said Letters Patent is hereby corrected as shown below:

In the list of References Cited, the following 2 PCT cases were omitted:

WO 95/02281    1/19/95  
WO 97/31386    8/28/97

In the list of References Cited, the following 2 EPO cases were omitted:

0 645 716 A1    3/29/95  
0 742 612 A2    11/13/96

Signed and Sealed this

First Day of January, 2002

Attest:

JAMES E. ROGAN  
Attesting Officer     *Director of the United States Patent and Trademark Office*